United States Patent
Schwärzler

(10) Patent No.: US 6,179,717 B1
(45) Date of Patent: Jan. 30, 2001

(54) DRIVESHAFTS HAVING CONVOLUTED BOOT SEALS WITH VENTILATION FOR JOINT INTERIOR

(75) Inventor: Peter Schwärzler, Glattbach (DE)

(73) Assignee: GKN Löbro GmbH (DE)

(*) Notice: Under 35 U.S.C. 154(b), the term of this patent shall be extended for 0 days.

(21) Appl. No.: 09/249,884

(22) Filed: Feb. 16, 1999

(30) Foreign Application Priority Data

Feb. 17, 1998 (DE) .............................. 198 06 173

(51) Int. Cl.$^7$ ...................................... F16D 3/84
(52) U.S. Cl. .............................. 464/175; 464/173
(58) Field of Search ............................ 464/173, 175; 277/636, 928

(56) References Cited

U.S. PATENT DOCUMENTS

| | | | |
|---|---|---|---|
| 4,224,808 | * 9/1980 | Gehrke | 277/928 |
| 4,392,838 | * 7/1983 | Welchof et al. | 464/175 |
| 4,478,592 | * 10/1984 | Krude et al. | 464/173 |
| 4,702,483 | 10/1987 | Ukai et al. | |
| 5,308,284 | * 5/1994 | Renzo et al. | 464/175 |
| 5,765,837 | * 6/1998 | Schwarzler | 277/636 |

FOREIGN PATENT DOCUMENTS

| | | |
|---|---|---|
| 33 09 386 C1 | 3/1983 | (DE) . |
| 35 00 429 A1 | 1/1985 | (DE) . |
| 86 32 511 U1 | 4/1986 | (DE) . |
| 8632511 | 5/1987 | (DE) ............................... F16D/3/84 |
| 43 23 686 A1 | 7/1993 | (DE) . |
| 196 01 096 A1 | 1/1995 | (DE) . |
| 4323626C2 | 2/1995 | (DE) ............................... F16D/3/84 |
| 0 125 934 A1 | 2/1984 | (EP) . |
| 1 218 729 | 11/1968 | (GB) . |
| 63-69821 | 5/1988 | (JP) . |
| 6-185532 | 12/1992 | (JP) . |

* cited by examiner

*Primary Examiner*—Anthony Knight
*Assistant Examiner*—Aaron M Dunwoody

(57) ABSTRACT

A convoluted boot has a boot portion with annular folds, and collar portions adjoining the boot portion at both ends. A ventilation aperture is formed in the smaller one of the collar portions, the convoluted boot is provided for a universal joint which has an outer joint part and an inner joint part connected to a driveshaft. A larger collar portion is securable to the outer joint part and a smaller collar portion to the driveshaft. Inside the boot portion, near the smaller one of the collar portions, there is arranged an annular lip which is dimensioned in such a way that, with the driveshaft being axially aligned relative to the outer joint part, it rests under pre-tension against the driveshaft.

7 Claims, 1 Drawing Sheet

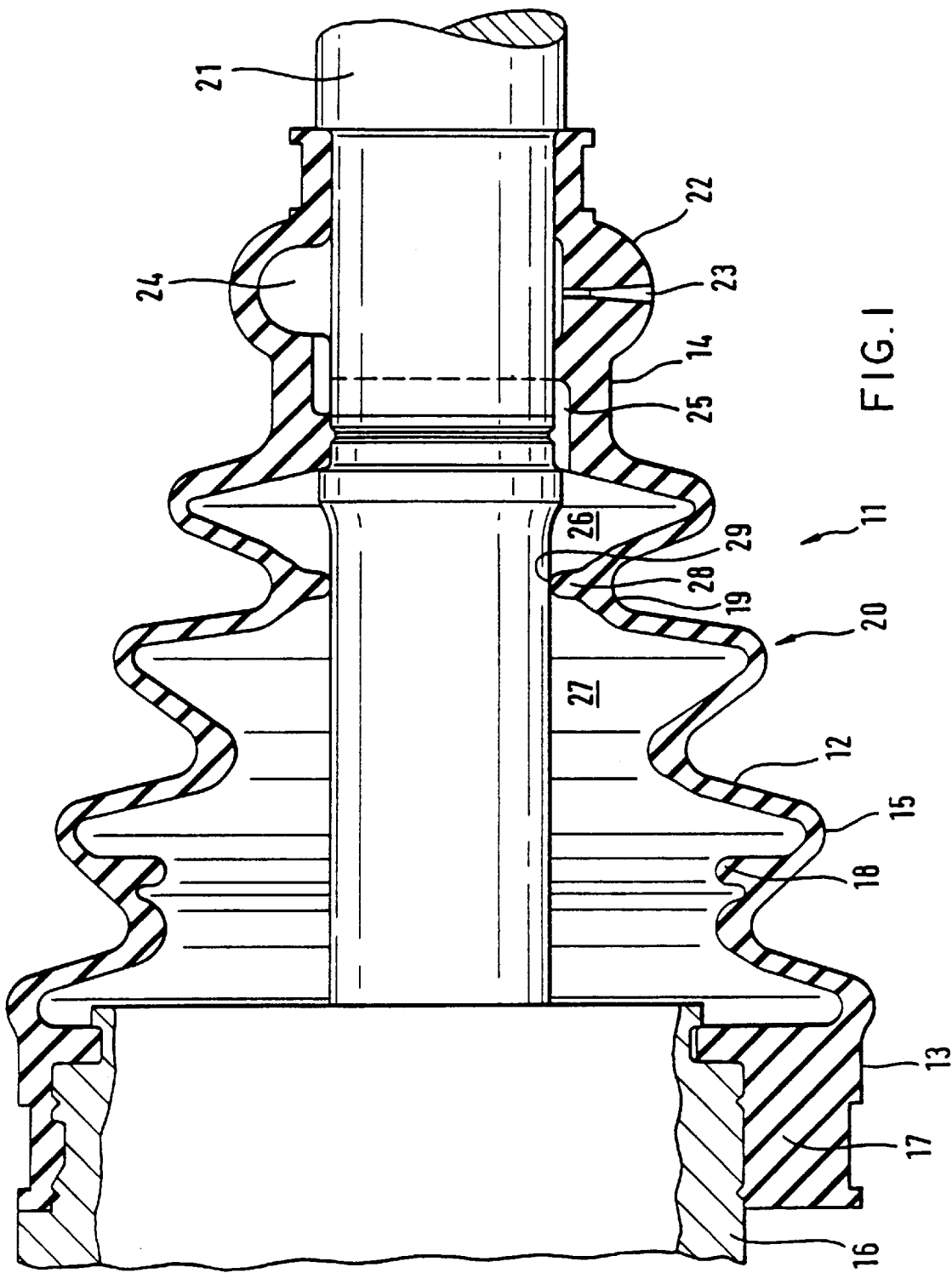

DRIVESHAFTS HAVING CONVOLUTED BOOT SEALS WITH VENTILATION FOR JOINT INTERIOR

BACKGROUND

The invention relates to a convoluted boot having a boot portion comprising annular folds, and collar portions adjoining the boot portion at both ends. A ventilation aperture is formed in the smaller one of the collar portions. The convoluted boot is provided for a universal joint which comprises an outer joint part and an inner joint part connected to a driveshaft. A larger collar portion is securable to the outer joint part and a smaller collar portion to the driveshaft.

Driveshafts whose universal joints are sealed by convoluted boots, in operation, are subject to pressure differentials between the joint and boot interiors on the one hand and the environment on the other hand. The pressure differentials may be due to differences between the operating temperature and the temperature of the environment, to the gassing behavior of the grease filling of the joint, to chemical reactions in the grease filling and to diffusion taking place through the convoluted boot wall. Such pressure differentials, especially a vacuum in the boot interior relative to the environment may cause the annular folds to collapse, especially during joint articulation. This results in inadmissible abrasion at the convoluted boot part. To avoid excessive pressure differentials it is known to provide convoluted boots of this general type with a ventilation aperture. A convoluted boot of such a type is known from DE 43 23 686 C2 wherein the connection between the ventilation aperture and the interior of the boot portion is permanently open. To avoid dirt or moisture from entering the interior of the convoluted boot in the assembled condition, the smaller collar portion, in its inside, is provided with a labyrinth channel for which there are proposed different shapes. Even with slight pressure differentials between the joint and boot interior and the environment, for example when driving through mud flat or water spray, a convoluted boot of this type fitted in a universal joint of a driveshaft of a motor vehicle allows the free entry of water or, at very high operating temperatures, loses greatly liquified grease.

It is therefore the object of the present invention to improve a convoluted boot of said type in such a way as to ensure a statistically small risk of moisture entering or grease emerging through the ventilation aperture.

SUMMARY OF THE INVENTION

The objective is achieved in that, inside the boot portion near the smaller one of the collar portions, there is arranged an annular lip dimensioned such that, with the driveshaft being axially aligned relative to the outer joint part, it rests under pre-tension against the driveshaft. In this way, without any complicated design measure, there are produced a valve means between the joint and convoluted boot interiors and the ventilation aperture. The valve means, in the case of uncritical pressure differentials, form a seal, but achieves a pressure biasing as a result of the deformation of the annular lip. Extreme inward bending or a collapse of the convoluted boot is thus avoided. In this embodiment, there is formed a further annular channel in the form of a kind of lock in which any moisture which may have entered is able to collect without reaching the interior proper of the convoluted boot.

On the one hand, any pressure differential occurring can cause the annular lip to lift off the driveshaft. The pressure differential required for opening the vale mean can be defined by the ratio of the outer diameter of the driveshaft relative to the inner diameter of the annular lip, taking into account the thickness and stiffness of the sealing lip.

In particular, the sealing lip can be dimensioned and arranged such that, bad setting an angular position, especially at an angle of 7.5 degrees or more, between the outer joint part and the driveshaft, the annular lip can be partially lifted off the circumference of the driveshaft in the angular plane.

As a result, the annular lip is designed such that, at large articulation angles of the driveshaft relative to the outer joint part, it can be partially lifted off, independently of the existing pressure differential, so that the valve means open. In this way, a complete pressure balance is ensured from time to time, independently of the exiting pressure differential; the possibility of achieving a pressure balance exists even if there are no high pressure differentials.

In this way, it is ensured that the pressure balance is ensured in principle, but occurs only rarely. The opportunity for moisture and dirt to enter the joint interior and boot interior is thus reduced considerably. By supporting the convoluted boot on the driveshaft by means of a contacting annular lip, there exists an additional advantage in that the rotational stability of the convoluted boot is increased considerably in that it is prevented from moving radially outwardly.

A preferred first embodiment consists in that the annular lip is formed by the inner face of a trough of the annular fold closest to the smaller collar portion. A further possibility consists in that the annular lip formed by in annular rib formed on to a trough of the annular fold closest to the smaller collar portion.

In a way known in itself, provision can additionally be made for a labyrinth channel to be arranged between the portion of the interior delimited by the annular lip and the ventilation aperture.

In this way, the probability of dirt and moisture entering the interior of the convoluted boot is reduced further. Different shapes of the annular channel are known from the state of the art quoted. Reference is therefore made to the contents of the earlier publication for possible shapes. The labyrinth channel can be composed of alternating circumferential and axial portions, it may be provided in the form of an inner spiral groove in the smaller collar portion, or it may consist of inner partial annular ribs circumferentially offset relative to one another.

BRIEF DESCRIPTION OF THE DRAWING

A referred embodiment of a convoluted boot in accordance with the invention is illustrated in the drawing and will be described below with reference thereto. A boot is illustrated in the sole FIGURE.

DETAILED DESCRIPTION

A convoluted boot 11 has a boot portion 12 with four outer folds, a first collar portion 13 with a greater diameter and a second collar portion 14 with a smaller diameter. The boot portion 12 has four annular folds 20 in the case of which the diameter of the fold peaks 15 is reduced from the collar portion 13 to the collar portion 14, so that the basic shape of the boot portion 12 is conical. The collar portion 13 is secured to an outer joint part 16 of a tripode joint, and because of the circumferentially irregular outer contour of the outer joint part, the collar portion is additionally provided with circumferentially distributed inner wall thickenings 17. One of the annular folds, on its inside, is provided with an annular rib 18 in the wall portion between a fold peak 15 and a fold trough 19 in order to increase rotational stability.

The smaller collar region 14 is secured to a driveshaft 21 which is capable of articulation relative to the outer joint part 16 of the tripode joint in that it is firmly connected to the inner joint part (not illustrated). Approximately in the center of the collar portion 14, there is provided an annular bead 22 which comprises a radial ventilation aperture 23. The latter ends in an inner annular channel 24 which, by means of a labyrinth channel 25, is connected to the interior of the boot portion 12. Near the smaller collar portion 14, on the inside of the boot portion 12, there is formed an annular rib 28 forming an annular lip 29 which is in circumferential contact with the driveshaft 21. As a result, a partial portion 26 is separated from the remaining interior 27 of the boot portion 12. The annular rib 28 is dimensioned in such a way that if there occurs a substantial pressure differential between the inner portions 26 and 27, a pressure balance is achieved in that the annular lip 29 lift off the driveshaft 21. In addition, in the case of extreme articulation angles between the outer joint part 16 and the driveshaft 21, the annular lip 29 is partially lifted off the circumference of the driveshaft, whether or not there exist a pressure differential. As such extreme articulation angles during operation are statistically rare, the possibility of dirt and moisture entering the joint interior 26 is theoretically largely excluded, especially as the labyrinth channel 25 consisting of two axial portions and one circumferential portion, in any case greatly complicates the entry of dirt and moisture.

Although a preferred embodiment has been disclosed, a worker in this art would recognize that modifications come within the scope of this invention. Thus, the following claims should be reviewed.

What is claimed is:

1. A convoluted boot comprising:
    a boot portion with annular folds, and collar portions adjoining said boot portion at both ends;
    a ventilation aperture in a smaller one of said collar portions, said convoluted booth being provided for a universal joint which comprises an outer joint part and an inner joint part connected to a driveshaft, wherein a larger collar portion is securable to the outer joint part and said smaller one of said collar portions is securable to the driveshaft; and
    inside said boot portion, near said smaller one of said collar portions, there is arranged an annular lip dimensioned such that, with the driveshaft being axially aligned relative to the outer joint part, said lip rests under pre-tension against the driveshaft, and
    wherein said annular lip is dimensioned and arranged such that, by setting an angular position between the outer joint part and the driveshaft, the annular lip can be partially lifted off the circumference of the driveshaft.

2. A convoluted boot according to claim 1, wherein when an angle of at least 7.5 degrees is set between the outer joint part and the driveshaft, said annular lip will be partially lifted off the circumference of the driveshaft.

3. A convoluted boot according to claim 1, wherein said annular lip is formed by an inner face of a trough of an annular fold closest to said smaller one of said collar portions.

4. A convoluted boot according to claim 1, wherein said annular lip is formed by an annular rib formed onto a trough of an annular fold closest to said smaller one of said collar portions.

5. A convoluted boot comprising:
    a boot portion with annular folds, and collar portions adjoining said boot portion at both ends;
    a ventilation aperture in a smaller one of said collar portions, said convoluted boot being provided for a universal joint which comprises an outer joint part and an inner joint part connected to a driveshaft, wherein a larger collar portion is securable to the outer joint part and said smaller one of said collar portions is securable to the driveshaft; and
    inside said boot portion, near said smaller one of said collar portions, there is arranged an annular lip dimensioned such that, with the driveshaft being axially aligned relative to the outer joint part, said lip rests under pre-tension against the driveshaft, and
    wherein between a portion of the interior delimited by said annular lip and the ventilation aperture, there is provided a labyrinth channel, and
    wherein in the region of said smaller one of said collar portions, there is provided an annular bead forming a circumferentially extending annular channel into which the labyrinth channel enters and from which said ventilation aperture emerges radially.

6. A convoluted boot according to claim 5, wherein said annular lip is dimensioned and arranged such that, by setting an angular position between the outer joint part and the driveshaft, the annular lip can be partially lifted off the circumference of the driveshaft.

7. A convoluted boot according to claim 6, wherein when an angle of at least 7.5 degrees is set between the outer joint part and the driveshaft, said annular lip will be partially lifted off the circumference of the driveshaft.

* * * * *